3,301,522
VALVE
Clifford L. Ashbrook, 5027 Cheena St., Houston, Tex. 77035, and Wilson G. Wing, 33 E. Rivercrest Drive, Houston, Tex. 77042
Original application Apr. 26, 1960, Ser. No. 24,787, now Patent No. 3,223,112, dated Dec. 14, 1965. Divided and this application Dec. 19, 1963, Ser. No. 337,693
5 Claims. (Cl. 251—61)

This invention relates to fluid valves and more particularly to a novel expansible piston valve. It is a division of our co-pending application, Serial No. 24,787 filed April 26, 1960, and now Patent No. 3,223,112; which is in turn a continuation-in-part of our application Serial No. 846,443, filed October 15, 1959, and now Patent No. 3,115,329.

In gas transmission systems, such as are used to transport natural gas to a local distribution point from distant well sites, the pipelines are of relatively large size, say from 4 inches to 30 inches. With such large pipelines, as well as for other reasons arising from the unique characteristics of this particular service, the provision of suitable valves, both for normal operating and emergency use, has heretofore not been solved to the degree desired. For example, it has long been considered important to provide a practical non-lubricated valve. This is not only because of the difficulty of providing adequate lubrication for reliable valve operation, even when the valve may not have been operated for a long period of time, as in emergency service, but also to avoid contamination of the gas by lubrication oil as is especially important in metering systems, as well as to provide a valve which will operate in extremes of temperature without either seizing or excess leakage either because of lubrication failure or valve element heat expansion. Furthermore, the provision of power to operate the valve has been a problem, for example with large valves in remote locations which must be operated rapidly to shut off in case of a pipeline break. A large valve of the heretofore known types cannot be operated by hand at a sufficiently high speed for such service, so that some form of power operation preferably without human intervention must be provided, which in itself raises a reliability problem. Even with power operation, speed of closing remains a problem especially in emergencies. Again, with cross country pipelines, pipeline cleaning is a problem and, ideally, a valve should permit the unobstructed travel of a pipeline cleaning device throughout the length of the pipeline. Finally, because of the large numbers of valves used in these systems, cost is a problem, yet reliability cannot be sacrificed.

Accordingly, it is an object of the present invention to provide a valve structure which meets all of the above enumerated problems and solves them in a highly satisfactory manner. This has been accomplished by providing a novel valve having an expansible piston which remains positioned in the valve passageway even in open position, the expansion and contraction of the expansible piston itself serving to close and open an annular area around the piston within the passage for fluid flow therearound. It is a particular feature of such a valve that sealing problems inherent in a movable piston are virtually eliminated, yet the unique passageway sealing provided by sealing around a substantial portion of the periphery of the piston is particularly effective making such valve especially useful at pressures of several thousand p.s.i. By a suitable configuration of the sealing surfaces of the expansible piston and the cooperating wall, a multi-stage sealing effect may be achieved.

Further objects and features of the invention will be apparent from the following detailed descriptions of preferred embodiments thereof, together with the accompanying drawings, wherein.

Figure 2:
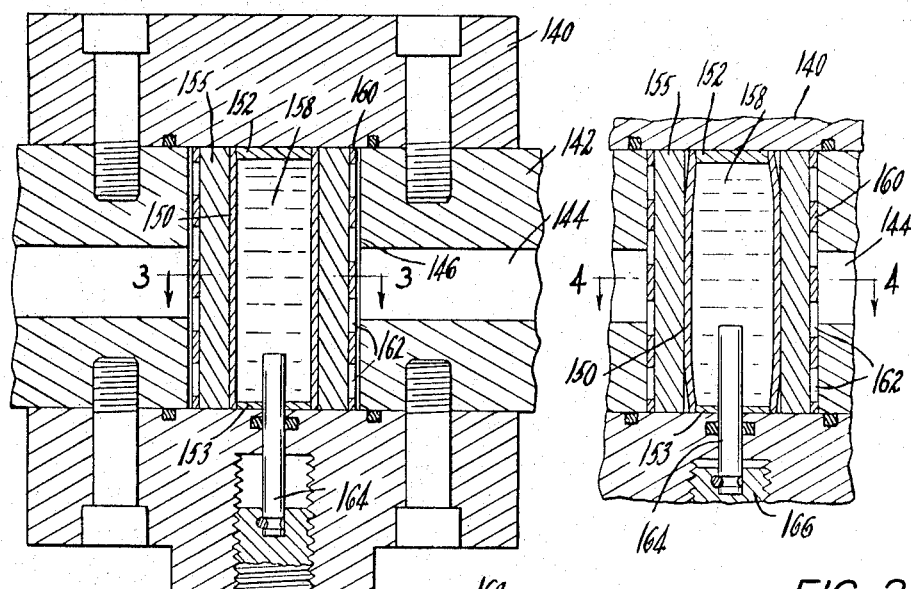
FIG. 2 is a partial sectional view of the valve of FIG. 1 in closed position.

In FIGS. 1 through 5 is shown the expansible piston valve of the invention wherein the piston thereof remains positioned in the through passage, the expansion and contraction of the piston itself serving to close and open an annular area around the piston. More specifically, this valve has a housing 140 with a central bore having a central body member 142 extending therethrough and secured therein by suitable bolts. The central body member has a longitudinal bore 144 providing a through passage for a fluid as well as a transverse bore with cylindrical chamber extending well beyond the diameter of bore 144 on both sides thereof. Within said chamber is mounted an expansible piston assembly preferably of a length of about three times the diameter of bore 144. Such assembly consists of a closed central expansible metallic tube member 150 preferably having end closure members 152 and 153 sealed to housing 140 and extending for the entire length of the chamber to contain a fluid 158, a rigid, thick split ring 155 concentric with and surrounding tube member 150 and an expansible metallic sealing cylinder 160 surrounding said split ring. Preferably sealing cylinder 160 is provided with a multiplicity of holes 162 so that higher sealing pressures may be achieved, or a ribbed surface may be used. A movable piston element 164 extends into the fluid 158 within tube member 150, such being operated, for example, by a screw 166 and handwheel 168, although, of course, more sophisticated controls might be used.

Figure 1:
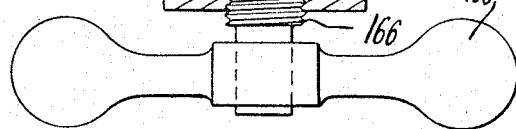
FIG. 1 is a sectional view of the invention with the stationary expansible piston shown in open position.
Figure 3:
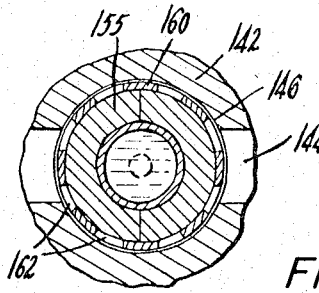
FIG. 3 is a partial sectional view of the valve of FIG. 1, taken on the line 3—3 thereof.

The normal, open, unexpanded, i.e., contracted, position of the valve is shown in FIGS. 1 and 3. There it will be seen that tube member 150 is in its normal, unstressed cylindrical form, operating piston 164 being withdrawn so that the fluid 158 sealed within member 150 is not under pressure. Hence, split ring 155 is not expanded because the elasticity of the surrounding sealing cylinder 160 clamps it together, the inside diameter of such sealing cylinder being preferably a slight interference fit with the split ring 155. The inside diameter of the chamber formed by wall 146 is, in order that a through passageway may be provided around the piston assembly, substantially larger than the outside diameter of the sealing cylinder 160 in its unexpanded condition, for example, about 2 to 5 percent of the radius of the piston provides a suitable clearance and one readily achieved with brass of 35,000 yield used as members 150 and 160.

Figure 4:
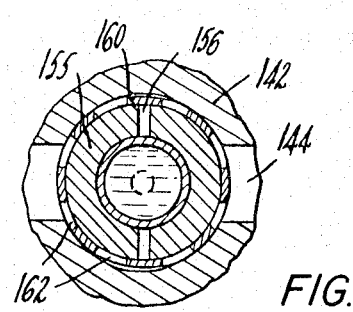
FIG. 4 is a partial sectional view of the valve of FIG. 1, taken on the line 4—4 of FIG. 2.
Figure 5:
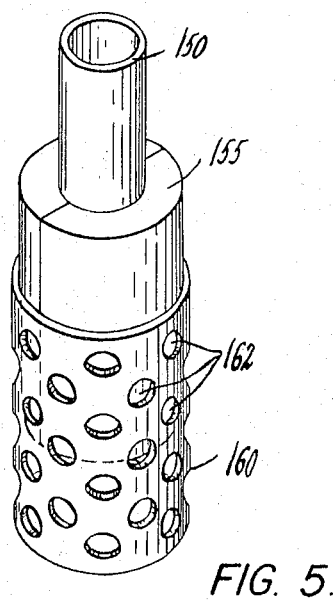
FIG. 5 is an enlarged isometric view of a portion of the valve of FIG. 1.

In order to close the passageway around the expansible element, handwheel 168 is operated to advance piston 164 into the fluid 158, which, being substantially uncompressible, expands the member 150 to a barrel shape, as is shown in exaggerated form in FIGS. 2 and 4. This action in turn opens the rigid split ring 155 which expands the resilient metallic member 160 into contact with the walls 146 of the chamber. Since this sealing action takes place throughout a substantial peripheral portion of the cooperating wall and cylinder, the wall as shown extending for about 120 degrees between the opposing edges of bore 144, a high degree of sealing is provided. Beyond the bore 144, sealing takes place around substantially the entire periphery, except for a limited distance near the open area 156 of split ring 155. The chamber extends well beyond the bore 144, preferably for a distance at least as great as the diameter of said bore.

This structure, then, provides a unique metal-to-metal high pressure seal structure, and one not dependent upon external seals. In fact, there is no communication between the controlling fluid and the outside of the valve structure if the end closure members 152 and 153 be soldered or similarly attached to the inside bore of the housing 140 or if a bellows, such as a conventional metallic bellows, be utilized as a seal for operating piston 164.

Although the invention has been described in connection with several preferred embodiments, those skilled in the art will appreciate that these embodiments are susceptible of various other modifications that are within the spirit and scope of the invention. Therefore, the invention should not be deemed to be limited to the details of what has been described herein by way of example, but rather it should be deemed to be limited only by the appended claims.

What is claimed is:

1. A valve adapted to produce a pressure seal, said valve comprising a housing having a cylindrical bore whose walls define a flow passage and a cylindrical chamber of a diameter greater than that of said bore extending perpendicular to said bore beyond opposite sides of said bore and with portions of its wall extending across opposite sides of said bore, a normally contracted expansible piston assembly disposed in said chamber for expanding and contracting movement between an open position wherein said piston is contracted within said chamber providing a flow passage between said piston and the wall of said chamber around the periphery of said piston and a closed position wherein said piston is expanded into contact with the walls of said chamber sealing said flow passage, support means adjacent the ends of said cylindrical chamber maintaining said piston in axially fixed position therein, said piston having a longitudinally rigid, radially expansible inner metallic element sealed at its end portions and an outer element having an unbroken surface which is stretched radially by said inner element into sealing engagement with the wall of said chamber entirely therearound on each side of said through flow passage to seal said through passage when said piston is in closed position, and means to expand said inner element to produce said sealing engagement.

2. A valve as claimed 1 wherein said outer element is a rubberlike material.

3. A valve as claimed in claim 1 wherein said outer element is metallic.

4. A valve adapted to produce a pressure seal, said valve comprising a housing having a cylindrical bore whose walls define a flow passage and a cylindrical chamber of a diameter greater than that of said bore extending perpendicular to said bore beyond opposite sides of said bore and with portions of its walls extending across opposite sides of said bore, a normally contracted expansible piston assembly disposed in said chamber for expanding and contracting movement between an open position wherein said piston is contracted within said chamber providing a flow passage between said piston and the wall of said chamber around the periphery of said piston and a closed position wherein said piston is expanded into contact with the walls of said chamber sealing said flow passage, support means adjacent the ends of said cylindrical chamber maintaining said piston in axially fixed position therein, said piston having a longitudinally rigid, radially expansible hollow tubular central portion sealed at its end portions providing an expansion chamber having an incompressible fluid therein, and control piston means extending axially of said expansion chamber through said support means into said expansion chamber and movable axially to change the volume of said expansion chamber to decrease said volume for expansion of said expansible piston into sealing engagement with the wall of said cylindrical chamber entirely therearound on each side of said through flow passage to seal said through flow passage when said piston is in closed position, and means to move said control piston to expand said expansible piston into said sealing engagement.

5. A valve adapted to produce a pressure seal, said valve comprising a housing having a cylindrical bore whose walls define a flow passage and a cylindrical chamber of a diameter greater than that of said bore extending perpendicular to said bore beyond opposite sides of said bore and with portions of its walls extending across opposite sides of said bore, a normally contracted expansible piston assembly disposed in said chamber for expanding and contracting movement between an open position wherein said piston is contracted within said chamber providing a flow passage between said piston and the wall of said chamber around the periphery of said piston and a closed position wherein said piston is expanded into contact with the walls of said chamber sealing said flow passage, support means adjacent the ends of said cylindrical chamber maintaining said piston in axially fixed position therein, said piston having a longitudinally rigid, radially expansible hollow tubular central portion comprising an inner expansible tube providing an expansion chamber having an incompressible fluid therein sealed at its end portions, relatively rigid split cylinder portions surrounding said inner expansible tube, an outer normally contracted expansible tube normally maintaining said split cylinder portions and said expansible tube in contracted condition, and control piston means extending axially of said expansion chamber through said support means into said expansion chamber and movable axially thereof to change the volume of said chamber to decrease said volume for expansion of said outer tube into sealing engagement with the wall of said chamber entirely therearound on each side of said through flow passage to seal said through flow passage when said piston is in closed position, and means to move said control piston to expand said expansible piston.

References Cited by the Examiner

UNITED STATES PATENTS 3,057,594   10/1962   Allen _____ 251—61

M. CARY NELSON, *Primary Examiner.*

E. K. FEIN, *Assistant Examiner.*